UNITED STATES PATENT OFFICE.

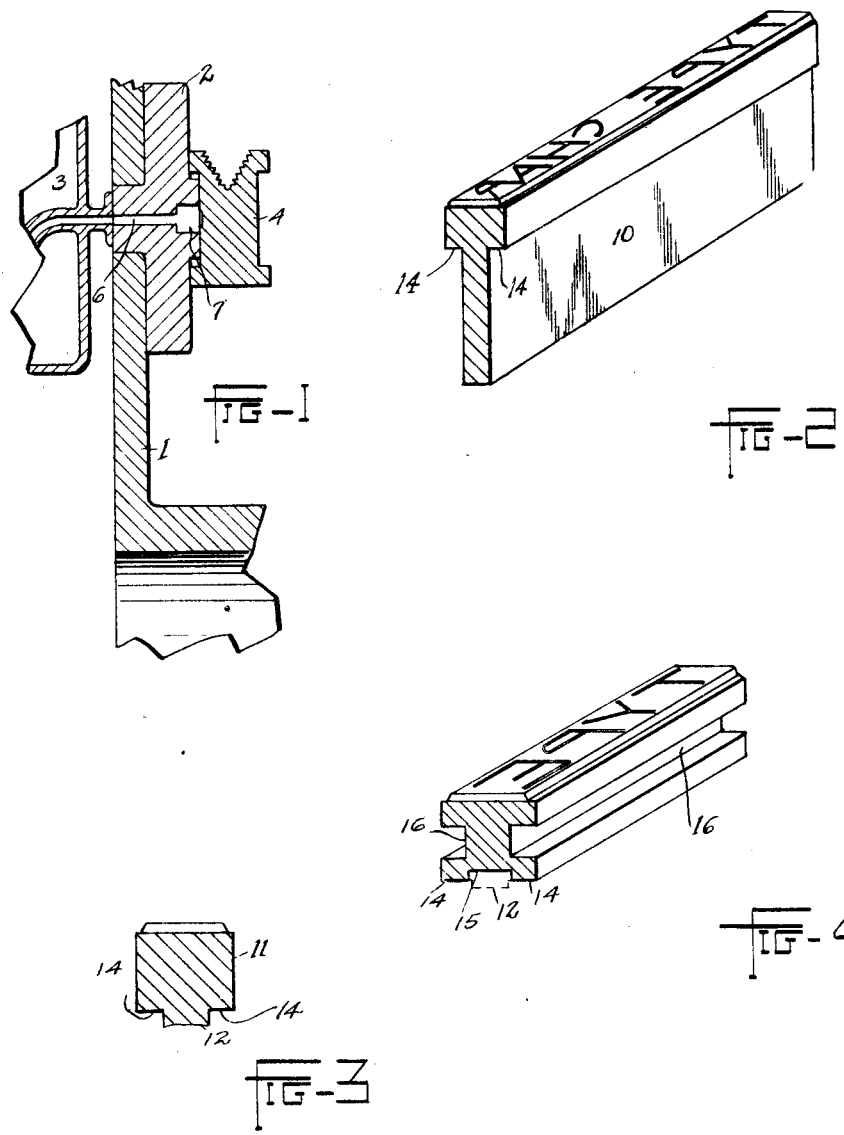

HARRY C. GAMMETER, OF CLEVELAND, OHIO, ASSIGNOR TO THE AMERICAN MULTI-GRAPH COMPANY, OF CLEVELAND, OHIO, A CORPORATION OF OHIO.

PROCESS OF MAKING LINOTYPE-SLUGS.

1,122,725.  Specification of Letters Patent.  Patented Dec. 29, 1914.

Application filed September 12, 1913. Serial No. 789,431.

*To all whom it may concern:*

Be it known that I, HARRY C. GAMMETER, a citizen of the United States, residing at Cleveland, in the county of Cuyahoga and State of Ohio, have invented a certain new and useful Improvement in Processes of Making Linotype-Slugs, of which the following is a full, clear, and exact description, reference being had to the accompanying drawings.

The object of this invention is to provide for the very cheap manufacture of linotype slugs grooved on their opposite sides and standing a short height-to-paper.

My invention includes a process for making such slugs accurately and cheaply.

Briefly, the process consists of casting a slug with a projecting head, the lower edge of which is to form the ultimate bottom of the slug and then grooving the sides of such head and removing the shank so that the short slug may stand on the cast surface. By making the slug so that the support comes on an original cast surface, accuracy is obtained, and the grooves, which are for the purpose of retaining slugs in their holder, may be cheaply and quickly made by any convenient machine. In removing the shank of the slug I remove it to a point within the body of the head; that is, I provide a groove on the bottom of the short slug so that the pressure will certainly come on an original cast surface.

My invention is hereinafter more fully explained in connection with the drawings hereof and its essential characteristics are summarized in the claims.

In the drawings, Figure 1 is a section of the mold wheel, the melting pot and the matrix of a Mergenthaler linotype machine having a special mold; Fig. 2 is a perspective view of a slug as cast by the mold shown in Fig. 1; Fig. 3 is a cross section of the head portion of such original slug after the major portion of the shank has been removed; Fig. 4 is a perspective view of the finished slug.

Referring to the parts by numerals, 1 indicates the mold wheel, 2 the mold thereon, 3 the melting pot, and 4 the matrices which stand in a line opposite the slot in the mold. As shown, this mold slot has a shank portion 6 which is parallel sided, and a head portion 7 which is also parallel sided but of larger cross section; that is to say, the slot is T-shaped.

Fig. 2 shows the slug cast by the mechanism of Fig. 1. In this view, 10 indicates the shank of the original slug and 11 the head thereof. The major portion of this shank close to the head is removed by breaking, shearing, milling, or any other convenient operation, so that there is left simply a short rib 12 on the under side of the head, as shown in Fig. 3. This rib 12 is then milled or planed away to insure the slug standing on the surfaces 14, which are cast surfaces. I carry the milling of the rib 12 to the point where it makes a groove 15 in the base of the short slug. Grooves 16 are formed by milling, or otherwise, in the sides of the short slug. The two grooves 16 and the groove 15 may conveniently be made at the same time by simple mechanism.

My finished slugs of the form shown in Fig. 4 may be used in any suitable printing holder which allows the slug to stand on its own base. To insure its standing on its base portion 14, the side grooves 16 are made of greater height than the material of the holder. Such holder may be the rails of a drum or segment, as used on the Multigraph, or a slotted plate for addresses, or of other form. The holder is simply for the purpose of retaining the slugs in position on the support against which the base of the slug bears and which receives the printing pressure. When in operation, the slug stands with the accurate height-to-paper resulting from resting on a cast bottom.

Having thus described my invention, what I claim is:

1. The process of making line slugs adapted to stand a short height-to-paper, consisting of casting a higher slug in a T-shape, the head having continuous up-and-down surfaces whereby it may be ejected from a fixed mold and having the desired height-to-paper and then removing the shank of the T to allow the head to stand on the cast under face thereof and grooving the opposite sides of the head.

2. The process of making line slugs consisting of casting the slug in the form of a T, and thereafter removing the shank of the T and grooving the head thereof.

3. The process of making line slugs consisting of casting the slug in a form having a T cross section, and then removing the shank of the T and grooving the opposite sides of the head thereof.

4. The process of making line slugs consisting of casting the slug in the form of a T, the head of which is uninterrupted in an up-and-down direction, then removing the shank of the slug and forming a groove in the base of the remaining head where the shank projected to insure cast surfaces being the only supporting bottom of the remaining slug, and making a longitudinal groove in the side of the head.

5. The process of making line slugs consisting of casting the slug in a T form and thereafter removing the shank of the T and grooving the base of the remaining head where the shank projected, and grooving the opposite sides of the head.

6. The process of making low-height line slugs adapted to be held between overhanging rails and rest on a cast surface consisting of casting in a fixed mold a higher slug with a shank and an overhanging head, the height of the head being the height of the finished low-height slug and said head having its sides free from longitudinal grooves, then ejecting said slug from the mold by pressure against the foot of the slug, then removing the shank below the head and grooving the opposite sides of the head.

In testimony whereof, I hereunto affix my signature in the presence of two witnesses.

HARRY C. GAMMETER.

Witnesses:
 ALBERT H. BATES,
 GEORGE T. TRUNDLE.